United States Patent [19]

Chen et al.

[11] Patent Number: 5,534,347
[45] Date of Patent: Jul. 9, 1996

[54] FUSING ROLL HAVING A FLUOROCARBON-SILICONE BARRIER LAYER

[75] Inventors: Tsang J. Chen, Rochester; Jiann-Hsing Chen, Fairport; Ming-Shih Lian, Pittsford; Lawrence P. DeMejo, Rochester; Gary F. Roberts, Macedon, all of N.Y.

[73] Assignee: Eastman Kodak Company, Rochester, N.Y.

[21] Appl. No.: 250,325

[22] Filed: May 27, 1994

Related U.S. Application Data

[63] Continuation of Ser. No. 940,929, Sep. 4, 1992, abandoned.
[51] Int. Cl.$^6$ ............................................. D02G 3/00
[52] U.S. Cl. ................... 428/375; 428/421; 428/447; 428/448; 428/906; 427/407.1; 427/409; 355/282; 355/295; 355/275; 355/279
[58] Field of Search ................... 428/375, 421, 428/906, 447, 339, 448, 450; 427/407.1, 409; 156/329; 432/228; 355/282, 285, 295, 274, 271, 279

[56] References Cited

U.S. PATENT DOCUMENTS

| | | | |
|---|---|---|---|
| 4,099,312 | 7/1978 | Hill et al. | 29/130 |
| 4,257,699 | 3/1981 | Lentz . | |
| 4,264,181 | 4/1981 | Lentz et al. | 355/3 FU |
| 4,272,179 | 6/1981 | Seanor . | |
| 4,387,176 | 6/1983 | Frye | 524/268 |
| 4,430,406 | 2/1984 | Newkirk et al. . | |
| 4,522,866 | 11/1985 | Nishikawa et al. | 428/216 |
| 4,536,529 | 8/1985 | Frye et al. | 524/284 |
| 4,711,818 | 12/1987 | Henry . | |
| 4,763,158 | 8/1988 | Schlueter, Jr. | 355/3 |
| 4,810,564 | 3/1989 | Takahashi et al. . | |
| 4,853,737 | 8/1989 | Hartley et al. | 355/289 |
| 4,910,559 | 3/1990 | Kuge et al. . | |
| 4,913,991 | 4/1990 | Chiba et al. | 430/45 |
| 4,970,098 | 11/1990 | Ayala-Esquilin . | |
| 5,035,950 | 7/1991 | Del Rosario . | |
| 5,061,965 | 10/1991 | Ferguson et al. . | |
| 5,166,031 | 11/1992 | Badesha et al. . | |
| 5,200,284 | 4/1993 | Chen et al. . | |
| 5,281,506 | 1/1994 | Badesha et al. | 430/124 |

FOREIGN PATENT DOCUMENTS

| | | |
|---|---|---|
| 291081A | 11/1988 | European Pat. Off. . |
| 2/294678 | 12/1990 | Japan . |

OTHER PUBLICATIONS

Research Disclosure 27567, Anonymous, Fuser Blade Oiler, Mar. 1987, p. 172.
Research Disclosure 21733, Anonymous, Fuser Member, May 1982, pp. 175–178.
P. Pawar, Flame–Retardant Poyolefins Don't Need Halogen, Plastics Technology, Mar. 1990, pp. 75–79.

*Primary Examiner*—Patrick J. Ryan
*Attorney, Agent, or Firm*—Anne B. Kiernan

[57] ABSTRACT

Toner fusing rolls having an oil barrier layer composed of a substrate coated with a fluorocarbon-silicone polymeric composition which is obtained by concurrently curing a fluorocarbon copolymer, a nucleophilic fluorocarbon-curing agent and a heat-curable polyfunctional poly($C_{1-6}$ alkyl)phenylsiloxane polymer.

20 Claims, No Drawings

FUSING ROLL HAVING A FLUOROCARBON-SILICONE BARRIER LAYER

This is a continuation of application Ser. No. 07/940,929, filed Sep. 4, 1992, now abandoned.

FIELD OF THE INVENTION

This invention relates to toner fusing rolls and, more particularly, to such rolls coated with a fluorocarbon-silicone polymeric composition.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing step commonly consists of passing the substrate, such as a sheet of paper on which toner powder is distributed in an imagewise pattern, through the nip of a pair of rolls, at least one of which is heated. A persistent problem in this operation is that when the toner is heated during contact with the heated roll it may adhere not only to the paper but also to the fusing member. Any toner remaining adhered to the member can cause a false offset image to appear on the next sheet and can also degrade the fusing member. Another potential problem is thermal degradation of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Fusing rollers currently used in fusing toners can be of multilayered construction. A two-layer fusing roller frequently comprises a cylindrical core covered with a silicone elastomer layer and coated thereon a fluoroelastomer. Fluoroelastomer surface layers, which have a propensity to interact with toners and cause premature offsets, are used with releasing oils and are resistant to penetration by the oils. A multilayered roll frequently comprises a cylindrical core, covered with a silicone elastomer coated with a fluoroelastomer intermediate layer which serves as an oil-barrier layer to preserve the underlying silicone elastomer, and coated on the fluoroelastomer layer a thin surface layer of a silicone elastomer. The surface layer thus has the advantageous releasing properties of the silicone elastomers and offset is minimized. However, due to marginal adhesion of fluoroelastomer layers to silicone elastomers, the inner silicone elastomer surface must be first exposed to a high voltage discharge, known as corona discharge treatment (CDT), before a thin coating of fluoroelastomer is applied. Similarly the fluoroelastomer layer must be exposed to CDT before a silicone surface layer is applied. Such treatment is inefficient and unacceptable adhesion of the current fluoroelastomer overcoats or interlayers is common and adds to the overall cost of fabrication of such rolls.

U.S. Pat. No. 4,264,181 discloses fusing members coated with a metal-filled elastomer surface obtained by nucleophilic-addition curing of a mixture of a metal filler and a vinylidene fluoride-hexafluoropropylene copolymer. Mixtures of the fluoroelastomers with silicone rubbers are also contemplated (Column 8, Lines 26–29) but no specific examples of suitable silicones are taught. The surface coatings are used in conjunction with functionally substituted polymeric release agents capable of interacting with the metal component.

U.S. Pat. No. 4,853,737 discloses a roll useful in electrostatography having an outer layer comprising a cured fluoroelastomer containing pendant polydiorganosiloxane segments that are covalently bound to the backbone of the fluoroelastomer.

There is still a need for coating compositions to provide a fusing roll with an intermediate oil-barrier layer which adheres strongly to a silicone elastomer layer, preferably without requiring CDT processing of the underlying surface.

SUMMARY OF THE INVENTION

The present invention relates to multilayered fusing rolls provided with an underlying silicone elastomer layer coated with a strongly adhesive fluorocarbon-silicone based polymeric composition which serves as an intermediate oil-barrier layer.

The fusing roll of the invention comprises a cylindrical core coated with an underlying layer of a silicone elastomer and, coated thereon a cured composition formed by heating a mixture comprising a fluorocarbon polymer, a fluorocarbon-curing agent and a curable polyfunctional poly($C_{1-6}$ alkyl)phenylsiloxane polymer. The concurrent curing of the components of the polymeric mixture creates an interpenetrating network of the individually cured polymers.

The coating composition is obtained by compounding the aforementioned polymeric components and the fluorocarbon-curing agent with a fluorocarbon-curing accelerator and one or more fillers to form a uniform, dry, flexible composite suitable for dispersion in a solvent for thin coating applications.

DETAILED DESCRIPTION OF THE INVENTION

A coated fusing roll of the invention is provided with an oil-barrier layer which is obtained by coating an underlying silicone elastomer, coated directly or indirectly on a cylindrical core, with a composition formed by compounding a mixture comprising a fluorocarbon polymer, a fluorocarbon-curing agent, a curable polyfunctional poly($C_{1-6}$ alkyl)phenylsiloxane polymer, one or more fillers and an accelerator for promoting crosslinking between the curing agent and the fluorocarbon polymer. The siloxane polymer is preferably heat-curable and is cured concurrently with the fluorocarbon polymer.

While not wishing to be bound by theory it is believed that the concurrent curing of the individual polymers of the mixture results in an interpenetrating network of essentially separately crosslinked polymers. That is, the network formed by crosslinking the fluorocarbon polymer with the fluorocarbon-curing agent and the network formed by crosslinking of the polyfunctional siloxane polymer mesh together to create an interpenetrating polymeric network. There are few, if any, bonds between the two networks. The presence of the silicone in the cured polymeric mixture provides a coating with improved adhesion to the silicone base while maintaining the excellent oil resistant characteristics of the fluorocarbon polymer.

Fluorocarbon polymers and silicones tend to phase separate under high shear or poor mixing conditions because, on a molecular level, they are incompatible and will not readily mix. Phase separation can be avoided by careful blending and compounding to form an intimate, homogeneous, solid mixture of the polymeric components and the addenda, such as the curing agent, accelerators and fillers. The solid composite thus obtained provides the conditions for forming an interpenetrating network. It is also found that on reducing the composite to fine particles and suspending them in a coating solvent, phase separation is avoided and, after coating and removing the solvent, a uniform solid layer is obtained. These novel composites are suitable for thin coating applications, such as solvent transfer coating and extrusion melt coating, however, they may also be molded or extruded to form articles and sheets of varying dimensions and thickness.

In one aspect of the invention the mechanical mixing is carried out in a two-roll mill by compounding, for example, the fluorocarbon polymer, the siloxane polymer, the fillers and accelerator until a uniform, smooth sheet is obtained. The composite thus obtained is reduced to small particles for dispersing in a solution of the fluorocarbon-curing agent in a coating solvent. The particles are small enough to effect solution of the soluble components in less than about 5 hours, thus minimizing gel formation for compositions having a tendency to gel rapidly.

In another aspect of the invention, the fluorocarbon-curing agent is introduced to the compounding mixture whereas the siloxane polymer is withheld from the compounding process and added to the coating dispersion.

In yet another aspect of the invention, additional functionalized polydiorganosiloxanes, for example, silanol- or aminoalkyl-terminated polydimethylsiloxanes, are added to the coating dispersion in small quantities to improve the wetting properties of the coating composition.

Suitable fluorocarbon polymers of the invention include the vinylidene fluoride based fluoroelastomers containing hexafluoropropylene known commercially as Viton A. Also suitable are the terpolymers of vinylidene fluoride, hexafluoropropylene and tetrafluoroethylene known commercially as Viton B or Fluorel FX 2530. Viton A and Viton B and other Viton designations are trademarks of E. I. dupont de Nemours and Company. Other suitable commercially available materials include, for example, vinylidene fluoride-hexafluoropropylene copolymers Fluorel FC 2174 and Fluorel FC 2176. Fluorel is a trademark of the 3M Company. Other vinylidene fluoride based polymers which can be used are disclosed in U.S. Pat. No. 5,035,950, the disclosure of which is hereby incorporated by reference. Mixtures of the foregoing vinylidene fluoride-based fluoroelastomers may also be suitable. Although it is not critical in the practice of this invention, the number-average molecular weight range of the fluorocarbon polymers or polymers may vary from a low of about 10,000 to a high of about 200,000. In the more preferred embodiments, the vinylidene fluoride-based fluoroelastomers have a number-average molecular weight range of about 50,000 to about 100,000.

Suitable fluorocarbon-curing agents or crosslinking agents for use in the process of the invention include the nucleophilic addition curing agents as disclosed, for example, in the Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluorocarbon polymers, fluoroelastomers preferably, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Inert fillers are frequently added to polymeric compositions to provide added strength and abrasion resistance to a surface layer. However, for an intermediate layer, such as an oil barrier layer, inclusion of the inert filler may not be necessary. Omission of the inert filler does not reduce the adhesive strength of the layer. Suitable inert fillers which are optionally used for producing these composites include mineral oxides, such as alumina, silicate or titanate, and carbon of various grades. Nucleophilic addition-cure systems used in conjunction with fluorocarbon polymers can generate hydrogen fluoride and thus acid acceptors are added as fillers. Suitable acid acceptors include Lewis acids such as metal oxides or hydroxides, for example, magnesium oxide, calcium hydroxide, lead oxide, copper oxide and the like, which can be used alone or as mixtures with the aforementioned inert fillers in various proportions.

The curable polyfunctional poly($C_{1-6}$ alkyl)phenylsiloxane polymers, useful in the practice of this invention, when cured concurrently with the fluorocarbon polymers, preferably fluoroelastomers produce coatings which adhere strongly to silicone elastomer underlayers without corona discharge treatment (CDT) of the silicone elastomer surface. Such coated underlayers are suitable for use on fusing rolls as an intermediate oil-barrier layer. A thin, low energy surface layer of a silicone elastomer can be readily coated on the fluorocarbon-silicone barrier layer without CDT of the barrier layer.

Preferred curable poly($C_{1-6}$ alkyl)phenylsiloxane polymers are heat-curable siloxanes, however peroxide-curable siloxanes can also be used with conventional initiators. Heat curable siloxane polymers include the hydroxy-functionalized organopolysiloxanes belonging to the classes of silicones known as "hard" and "soft" silicones. Preferred hard and soft silicones are silanol-terminated polyfunctional organopolysiloxanes containing repeating units of the formula,

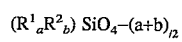

$$(R^1_a R^2_b) SiO_{4-(a+b)/2}$$

wherein, $R^1$ and $R^2$ are independently ($C_{1-6}$ alkyl) or phenyl; and a and b are independently 0 to 3.

Alkyl groups which $R^1$ and $R^2$ can represent include methyl, ethyl, propyl, isopropyl, butyl, sec.butyl, pentyl and hexyl. Preferred hard and soft silicones are those in which $R^1$ and $R^2$ are independently methyl or phenyl.

Both hard and soft silicones can contain various proportions of mono-, di-, tri- and tetra-functional siloxane repeating units. The degree of functionality influences the hardness of the silicone. In general, the greater the functionality the harder is the silicone. However, the predominant influence on hardness is the ratio of phenyl to alkyl groups present. Preferred hard silicones are characterized by having a ratio of phenyl to methyl groups of at least about 1 to 1, preferably between about 1 and 2 to 1. Soft silicones have a ratio of phenyl to methyl groups less than about 0.5 to 1, preferably no phenyl groups are present. Hard silicones generally have a number-average molecular weight (Mn) of less than about 10,000, preferably less than about 4,000. Polyfunctional hard silicones of such molecular weights have a high level of crosslinking on curing which contributes to the hardness. Soft silicones generally have a number-average molecular weight of greater than 20,000, preferably greater than 100,000 which results in a low level of crosslinking on curing. Both hard and soft silicones can be used singly or as mixtures of silicones and, in addition, can contain minor amounts of one or more polyfunctional silicones having number-average molecular weights in the range of 1,000 to 300,000.

Particularly suitable silicones are the heat-curable silanol-terminated hard silicone copolymers comprising difunctional and trifunctional siloxane repeating units of the formulae,

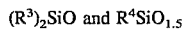
$(R^3)_2SiO$ and $R^4SiO_{1.5}$ wherein $R^3$ and $R^4$ are independently methyl or phenyl provided that the ratio of phenyl to methyl groups is at least about 1 to 1.

Exemplary hard and soft silicones are commercially available or can be prepared by conventional methods. For example, DC6-2230 silicone and DC-806A silicone (sold by Dow Corning Corp.), are hard silicone polymers, and SFR-100 silicone (sold by General Electric Co.) and EC 4952 silicone (sold by Emerson Cummings Co.), are soft silicone polymers. DC6-2230 silicone is characterized as a silanol-terminated polymethylphenylsiloxane copolymer containing phenyl to methyl groups in a ratio of about 1 to 1, difunctional to trifunctional siloxane units in a ratio of about 0.1 to 1 and having a number-average molecular weight (Mn) between 2,000 and 4,000. DC 806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR 100 silicone is characterized as a silanol- or trimethylsilyl-terminated polymethylsiloxane and is a liquid blend comprising about 60–80 weight percent of a difunctional polydimethylsiloxane having a number-average molecular weight of about 90,000 and 20–40 weight percent of a polymethylsilyl silicate resin having monofunctional (i.e. trimethylsiloxane) and tetrafunctional (i.e. $SiO_2$) repeating units in an average ratio of between about 0.8 and 1 to 1, and having a number-average molecular weight of about 2,500. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000.

The coating compositions of the invention adhere strongly to an underlying silicone elastomer without prior CDT of the elastomer surface. However, if desired, CDT can still be performed without loss of adhesive strength. In order to achieve the desired adhesive strength the coating composition of the invention must contain a hard silicone, preferably at least 10 parts per 100 parts of the fluorocarbon polymer. Mixtures of hard and soft silicones can also be used and such compositions preferably contain at least 10 parts of the hard silicone and less than 25 parts of the soft silicone per 100 parts of the fluorocarbon polymer.

Preferred composites of the invention have ratios of siloxane polymer to fluorocarbon polymer between about 0.1 and 10 to 1 by weight, preferably between about 0.2 and 2 to 1. The composite is preferably obtained by curing a mixture comprising from about 30–70 weight percent of a fluorocarbon polymer, 30–60 weight percent of a curable polyfunctional poly($C_{1-6}$ alkyl)phenylsiloxane polymer, 1–10 weight percent of a fluorocarbon-curing agent, 1–3 weight percent of a fluorocarbon-curing accelerator, 5–20 weight percent of an acid acceptor type filler, and 0–30 weight percent of an inert filler.

Curing of the composite is carried out according to the well known conditions for curing vinylidene fluoride based polymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

The rolls of the invention can be coated with the fluorocarbon-silicone composite by conventional techniques. Solvent transfer coating techniques are preferred. Coating solvents which can be used include polar solvents, for example, ketones, acetates and the like. Preferred solvents for the fluoroelastomer based composites are the ketones, especially methyl ethyl ketone and methyl isobutyl ketone. The composites are dispersed in the coating solvent at a concentration of between about 10 to 50 weight percent, preferably between about 20 to 30 weight percent and coated on the fusing member to give a 10 to 100 μm thick sheet on drying. The coated article is cured under the conditions described above.

In accordance with the present invention, the coated roll can be a multilayered fusing roll for fusing a thermoplastic toner image to a substrate such as a sheet of paper. When used with a fusing roll, the fluorocarbon-silicone composite of the invention can be applied to a silicone elastomer underlayer, for example, EC 4952 silicone to form an intermediate oil-barrier layer. A thin outer layer of a silicone elastomer is then applied to the composite. The underlying and outer silicone elastomers, which can be the same or different are selected from silicone elastomers used in conventional toner fusing roll applications, such as EC 4952 silicone, Silastic E silicone and Silastic J silicone (sold by Dow Corning Corp.).

The cured coatings of the invention have exhibited strong adhesion, without CDT, to adjacent silicone elastomer layers and have excellent oil-barrier properties, as indicated in examples hereinafter.

The rolls produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples illustrate the compounding, coating, curing and testing of fluorocarbon polymer-silicone composites.

EXAMPLE 1

One hundred parts of Viton A fluoropolymer (a copolymer of vinylidene fluoride and hexafluoropropylene from E. I.

dupont de Nemours & Co.), 15 parts of lead mono-oxide, 20 parts of Stainless Thermax N990 carbon black (from R. T. Vanderbilt Co.), 6 parts of 2,2-bis(4-hydroxyphenyl) hexafluoropropane and 2.5 parts of benzyl triphenylphosphonium chloride were thoroughly compounded on a two-roll mill until a uniform, dry, flexible composite in the form of a sheet was obtained.

The composite sheet was divided into small pieces and 100 parts were dissolved in methyl ethyl ketone and combined with 72 parts of DC6-2230 polyfunctional poly($C_{1-6}$ alkyl)phenylsiloxane polymer (from Dow Corning Corp.) to form a 20 weight percent dispersion. The dispersion was then spray-coated on a cured silicone elastomer cushion (EC-4952 from Emerson Cummings Co.) without CDT, air-dried for 24 hours, heated to 450° F. (approx. 232° C.) over a 24 hour period, and cured for 24 hours at 450° F. (approx. 232° C.). The coating film was about 25 micrometer dry thickness.

Peel Test

The cured coating was cut into strips for peel-testing on an Instron apparatus. An average peel strength of 1.52 oz (approx. 0.043 Kg) was obtained. A standard Viton A composite, coated on a EC-4952 silicone elastomer without CDT, has a lower peel strength, 0.46 oz. (0.013 Kg), well below the minimum acceptable peel force of 1.25 oz. (0.035 Kg).

EXAMPLE 2

One hundred parts of Viton A fluoropolymer, 15 parts of lead mono-oxide, 20 parts of Stainless Thermax N990 carbon black, 2.5 parts of benzyl triphenylphosphonium chloride and 10 parts of DC6-2230 silicone were compounded on a two-roll mill until a uniform, smooth sheet was obtained. The composite sheet was divided into small pieces and 100 parts were dispersed in methyl ethyl ketone. 2,2-Bis(4-hydroxyphenyl) hexafluoropropane (6 parts) was added to the dispersion to give a 20 weight percent dispersion. The dispersion was applied to a silicone rubber mold. The silicone rubber mold was formed by injecting EC-4952 silicone rubber into a clean, dry stainless steel mold. The rubber was cured for 24 hours, at room temperature and post-cured for 12 hours ramp to 410° F., and 48 hours at 410° F. in a convection oven. The rubber was allowed to cure to room temperature. Then the fluorocarbon-silicone dispersion was spray-coated onto the silicone rubber base cushion without CDT, air dried for 24 hours, heated to 450° F. over a 24 hour period and cured for 24 hours at 450° F. The coating was about 25 microns thick when dry.

EXAMPLE 3

By following essentially the same procedure as described for Example 2, except that 25 parts of DC6-2230 silicone were added, a 20 weight percent methyl ethyl ketone dispersion was obtained. The dispersion was applied to a silicone rubber mold as described in Example 2.

EXAMPLE 4

By following essentially the same procedure as described for Example 2, except that 50 parts of DC6-2230 silicone were added a 20 weight percent methyl ethyl ketone dispersion was obtained. The dispersion was applied to a silicone rubber mold as described in Example 2.

An Instron Peel Test was performed using a peel rate of 1 cm/min. The fluorocarbon-silicone barrier layer was peeled at an 180° peel angle from the coating by moving the upper clamp assembly. The silicone rubber layer was held stationary in the lower clamp. The peel force was measured for the slabs of Examples 2–4 and the results are recorded in Table 1.

EXAMPLE 5

Preparation of a Fusing Roll Having a Fluorocarbon-Silicone Barrier Layer

A cylindrical core was coated with a conventional silicone priming agent, the primed core was dried and blade coated with a layer of EC 4952 silicone elastomer (red rubber which was then cured to provide a resilient underlayer having a dry thickness of 2.5 mm. The roll was surface ground to size. The underlayer was ring coated with a 20 weight percent methyl ethyl ketone solution of a fluorocarbon-silicone composite prepared by compounding 100 parts of Viton A fluoropolymer, 15 parts of lead-monoxide, 20 parts of Thermax N990 carbon black, 4.5 parts of 2,2-bis(4-hydroxyphenyl)hexafluoropropane, 2.5 parts of benzyl triphenylphosphonium chloride and 50 parts of DC6-2230 silicone on a two-roll mill. A 25 μm layer was formed and the roll was cured under the conditions described in Example 1. The fluorocarbon-silicone layer was then ring coated with Silastic E (from Dow Corning Corp.) to give a 37.5 μm surface layer which was cured by ramping to 200° C. over 4 hours and heating at 200° C. for 12 hours.

TABLE 1

| Peel Test for Examples 2–4 on EC 4952 silicone (No CDT) | | |
| --- | --- | --- |
| Example ID | Parts of Silicone Added in the Mill | Peel Strength Oz. (Kg) |
| 2 | 10:DC6-2230 | 1.23 (0.036) |
| 3 | 25:DC6-2230 | 1.41 (0.039) |
| 4 | 50:DC6-2230 | 2.50 (0.07) |

EXAMPLE 6

By following essentially the same procedure as described for Example 2, using 50 parts of DC6-2230 silicone and 5 parts of an α,ω-(3-aminopropyl)-polydimethylsiloxane (Mn=8,000), a 20 weight percent methyl ethyl ketone dispersion was obtained. The α,ω-(3-aminopropyl)-polydimethylsiloxane was prepared by conventional ring opening polymerization of octamethyltetrasiloxane in the presence of an end-capper 1,1,3,3-tetramethyl-3,3-bis(3-aminopropyl)disiloxane. The dispersion was applied to a silicone rubber mold as described in Example 2.

EXAMPLE 7

By following essentially the same procedure as described for Example 2, except that 50 parts of DC6-2230 silicone were used and 2,2-bis(4-hydroxyphenyl)hexafluoropropane was milled in during the compounding step. A 20 weight percent methyl ethyl ketone dispersion was obtained. The dispersion was applied to a silicone rubber mold as described in Example 2.

EXAMPLE 8

By following essentially the same procedure as described for Example 7, using 50 parts of DC6-2230 silicone and adding 5 parts of the α,ω-(3-aminopropyl)-polydimethylsiloxane (Mn=8,000) to the dispersion, a 20 weight percent methyl ethyl ketone dispersion was obtained. The dispersion was applied to a silicone rubber mold as described in Example 2.

EXAMPLE 9

By following essentially the same procedure as described for Example 7, using 50 parts of DC6-2230 silicone and adding 10 parts of SFR-100 polyfunctional polymethylsiloxane polymer (from General Electric Co.) to the dispersion, a 20 weight percent methyl ethyl ketone dispersion was obtained. The dispersion was applied to a silicone rubber mold as described in Example 2.

TABLE 2

Peel Test for Examples 6–9 on EC 4952 (No CDT)

| Example ID | Parts Aminosiloxane Added | Parts SFR-100 Added | Peel Strength Oz. (Kg) |
|---|---|---|---|
| 6 | 5 | 0 | 1.57 (0.044) |
| 7 | 0 | 0 | 1.50 (0.042) |
| 8 | 5 | 0 | 1.24 (0.035) |
| 9 | 0 | 10 | 1.36 (0.038) |

EXAMPLES 10–16

Two-layer fuser rolls were fabricated by ring coating fluorocarbon/silicone composites, prepared essentially as described for Examples 1–9, on a 90 mil (approx. 2.25 mm) EC-4952 silicone underlying layer, with or without CDT, and subsequently heat-cured as described in Example 1. The composition of the roll outer coating layers, based on 100 parts of Viton A, are shown in Table 3. In some examples silanol-terminated soft silicone (SFR-100) or α,ω-(3-aminopropyl)-polydimethylsiloxane (Mn=8,000) was added as a wetting agent to the coating solution to aid coating.

TABLE 3

Rolls Coated with Viton/Silicone Polymers

| Example ID | CDT | Silicone Polymer/Fluid Added During Compounding (Parts) | Silicone Fluid As Coating Aid (Parts) |
|---|---|---|---|
| 10 | Yes | 10:DC6-2230 | 10:SFR-100 |
| 11 | Yes | 25:DC6-2230 | 10:SFR-100 |
| 12 | No | 50:DC6-2230 | 5:Aminosiloxane |
| 13 | Yes | 50:DC6-2230 | 10:SFR-100 |
| 14 | Yes | 30:DC6-2230/20:SFR-100 | — |
| 15 | Yes | 20:DC6-2230/30:SFR-100 | — |
| 16 | Yes | 20:DC6-2230/50:SFR-100 | — |

Life tests were run on several of the rolls of Examples 10–16 to verify the improvement in adhesion to the underlying layer. None of the rolls which were life-tested in a fuser assembly for fusing of color toners on paper receiver sheets for 13,000 to 36,000 copies showed any signs of delamination from the underlying layer, with or without CDT. A typical Viton A fluoropolymer barrier layer, with CDT, would have suffered various degrees of delamination after a similar fusing exercise with the color toners.

Rolls of Examples 10–12 were tested for oil resistance and compared to a roll coated with Viton A fluoropolymer over EC 4952 silicone (with CDT) and a roll coated with a single layer of EC 4952 silicone. The results are shown in Table 4.

TABLE 4

Percent Weight Change of Rollers After 7 Days at 350° F. (Approx. 176° C.)

| Example ID | In Air (%) | In 350 cs PDMS Oil (%) |
|---|---|---|
| 10 | −0.35 | −0.32 |
| 11 | −0.33 | −0.21 |
| 12 | −0.30 | −0.23 |
| Viton A Control | −0.28 | −0.15 |
| EC 4952 Control | −0.62 | +6.72 |

Rolls provided with the coatings of the Examples 10–12 were equivalent to Viton A fluoropolymer coated rollers with negligible weight loss or gain in air or oil. The uncoated EC 4952 silicone control had a greater weight loss in air and absorbed a substantial amount of silicone oil.

Rolls provided with the coatings of Examples 12 and 13 were tested for peel strength and the results are shown in Table 5.

TABLE 5

Peel Test for Examples 12 and 13

| Example ID | CDT | Peel Strength Oz. (Kg) |
|---|---|---|
| 12 | No | 1.66 (0.047) |
| 13 | Yes | 1.66 (0.047) |

Although the invention has been described in detail with particular reference to certain preferred embodiments thereof, it should be appreciated that variations and modifications can be effected within the spirit and scope of the invention.

What is claimed is:

1. A coated roll comprising:

a substrate, and coated thereon an underlying layer of a silicone elastomer, and coated on said silicone elastomer a barrier layer formed by curing a polymeric composition comprising:

a fluorocarbon polymer;

a fluorocarbon-curing agent; and a curable polyfunctional poly($C_{1-6}$ alkyl)phenylsiloxane polymer, and creating an interpenetrating network consisting essentially of separately crosslinked polymers, said fluorocarbon polymer, and said fluorocarbon-curing agent form one said crosslinked polymer and said curable polyfunctional poly($C_{1-6}$ alkyl)phenylsiloxane polymer forms a second said crosslinked polymer.

2. A coated roll according to claim 1, wherein said polymeric composition further comprises an accelerator for curing said fluorocarbon polymer with said fluorocarbon-curing agent.

3. A coated roll according to claim 1, wherein said polymeric composition further comprises a filler.

4. A coated roll according to claim 1, wherein said fluorocarbon polymer is a copolymer of vinylidene fluoride and hexafluoropropylene.

5. A coated roll according to claim 1, wherein said fluorocarbon polymer is a terpolymer of vinylidene fluoride, hexafluoropropylene and tetrafluoroethylene.

6. A coated roll according to claim 1, wherein said fluorocarbon-curing agent is 2,2-bis(4-hydroxyphenyl)hexafluoropropane.

7. A coated roll according to claim 1, wherein said curable polyfunctional poly($C_{1-6}$ alkyl)phenylsiloxane polymer is a heat-curable polymer.

8. A coated roll according to claim 7, wherein said heat-curable polymer is a hydroxy-functionalized polymer.

9. A coated roll according to claim 7, wherein said heat-curable polymer is a hard silicone copolymer comprising repeating units of the formulae,

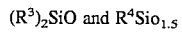
$(R^3)_2SiO$ and $R^4SiO_{1.5}$ wherein $R^3$ and $R^4$ are independently $C_{1-6}$ alkyl or phenyl, provided that the ratio of phenyl to $C_{1-6}$ alkyl groups is at least about 1 to 1.

10. A coated roll according to claim 9 wherein said hard silicone copolymer has a number-average molecular weight of less than 10,000 and a difunctional to trifunctional ratio of 0.1 to 1.

11. A fusing roll comprising:
a cylindrical core;
an underlying layer of a cured silicone elastomer;
a barrier layer, coated on said underlying layer, of a composition formed by curing a polymeric composition comprising a fluorocarbon polymer, a fluorocarbon-curing agent and a curable polyfunctional poly($C_{1-6}$ alkyl)phenylsiloxane polymer, and creating an interpenetrating network consisting essentially of separately crosslinked polymers, said fluorocarbon polymer and said fluorocarbon-curing agent form one said crosslinked polymer, and said curable polyfunctional poly($C_{1-6}$ alkyl)phenylsiloxane polymer forms a second said crosslinked polymer; and
an outermost layer of a cured silicone elastomer.

12. A fusing member comprising:
a substrate, and coated thereon an underlying layer of a silicone elastomer, and coated on said silicone elastomer a barrier layer formed by curing a polymeric composition comprising:
a fluoroelastomer;
a fluorocarbon-curing agent; and
a curable polyfunctional poly($C_{1-6}$ alkyl)phenylsiloxane polymer, and creating an interpenetrating network consisting essentially of separately crosslinked polymers, said fluoroelastomer and said fluorocarbon-curing agent form one said crosslinked polymer, and said curable polyfunctional poly($C_{1-6}$ alkyl)phenylsiloxane polymer forms a second crosslinked polymer.

13. A fusing member according to claim 12, wherein the ratio of said curable polyfunctional poly($C_{1-6}$ alkyl)phenylsiloxane polymer to said fluoroelastomer is between 0.1 and 10 to 1 by weight.

14. A fusing member according to claim 13, wherein the ratio of said curable polyfunctional poly($C_{1-6}$ alkyl)phenylsiloxane polymer to said fluoroelastomer is between 0.2 and 2 to 1 by weight.

15. A fusing member according to claim 12, wherein said barrier layer further comprises fluorocarbon-curing accelerator, acid acceptor type filler, and inert filler, wherein said barrier layer comprises 30–70 weight percent said fluoroelastomer, 30–60 weight percent said curable polyfunctional poly($C_{1-6}$ alkyl)phenylsiloxane polymer, 1–10 weight percent said fluorocarbon-curing agent, 1–3 weight percent said fluorocarbon-curing accelerator, 5–20 weight percent said acid acceptor type filler, and 0–30 weight percent said inert filler.

16. A fusing member according to claim 12, wherein said fluoroelastomer is a vinylidene fluoride-based fluoroelastomer.

17. A fusing member according to claim 12, wherein said fluorocarbon-curing agent is 2,2-bis(4-hydroxyphenyl)hexafluoropropane.

18. A fusing member according to claim 12, wherein said curable polyfunctional poly($C_{1-6}$ alkyl)phenylsiloxane polymer is a heat-curable polymer.

19. A fusing member according to claim 18, wherein said heat-curable polymer is a hydroxy-functionalized polymer.

20. A fusing member according to claim 19, wherein said heat-curable polymer is additionally a hard silicone copolymer comprising repeating units of the formulae,

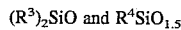
$(R^3)_2SiO$ and $R^4SiO_{1.5}$ wherein $R^3$ and $R^4$ are independently $C_{1-6}$ alkyl or phenyl, provided that the ratio of phenyl to $C_{1-6}$ alkyl groups is at least about 1 to 1 and having a difunctional to trifunctional ratio of 0.1 to 1.

* * * * *